(12) United States Patent
Fischer

(10) Patent No.: US 6,312,488 B1
(45) Date of Patent: Nov. 6, 2001

(54) TWO-PIECE WATER SEPARATING APPARATUS AND METHOD OF MAKING SAME

(75) Inventor: Christian Fischer, Fellbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/335,876

(22) Filed: Jun. 18, 1999

(30) Foreign Application Priority Data

Jun. 19, 1998 (DE) ................................................ 198 27 296

(51) Int. Cl.[7] .............................. B01D 50/00; B01D 45/08
(52) U.S. Cl. ........................ 55/315; 55/385.3; 55/418; 55/433; 55/462; 96/189
(58) Field of Search ..................... 55/385.3, 432, 55/433, 418, 434, 462, 465, 315; 96/188, 189, 190

(56) References Cited

U.S. PATENT DOCUMENTS

| 403,704 | * | 5/1889 | Stuart | 55/462 |
|---|---|---|---|---|
| 557,221 | * | 3/1896 | Parker | 55/462 |
| 2,075,337 | * | 3/1937 | Burnaugh | 55/462 |
| 4,041,569 | * | 8/1977 | Peterson | 55/462 |
| 4,080,184 | * | 3/1978 | Peterson | 55/385.3 |
| 6,143,049 | * | 11/2000 | Gieseke et al. | 55/385.3 |

FOREIGN PATENT DOCUMENTS

| 12/2500 | * | 2/1986 | (RU) | 55/465 |
|---|---|---|---|---|
| 1606154 | * | 11/1990 | (RU) | 55/465 |

* cited by examiner

*Primary Examiner*—David A. Simmons
*Assistant Examiner*—Robert A. Hopkins
(74) *Attorney, Agent, or Firm*—Crowell & Moring LLP

(57) ABSTRACT

An apparatus for separating liquids, in particular water, from gasses, in particular for separating entrained water from the intake air of an internal combustion engine. This is achieved by appropriately configuring a selected connection site in the intake section which precedes the air filter of the internal combustion engine. This has the advantage of requiring no parts in addition to the air conduit pieces already present. Separated water may be discharged, for example, through an outlet valve or small opening.

14 Claims, 2 Drawing Sheets

TWO-PIECE WATER SEPARATING APPARATUS AND METHOD OF MAKING SAME

BACKGROUND OF THE INVENTION

The invention relates to a device for separating liquids, particularly water, out of gasses, in particular the drainage of the intake air of an internal combustion engine.

Such water separators for insertion in the intake section of an internal combustion engine are known from the prior art. The principle for effecting the separation is based on the inertia of the water droplets being removed. Due to a sudden diversion or rerouting of the air path, the water droplets hit a collection surface and exit the system via an outlet provided for that purpose. These arrangements, however, require more pieces for construction and therefore increase the cost of materials and the difficulty and expense of assembling the water separator.

SUMMARY OF THE INVENTION

It is the object of the invention to provide an economical water separator with a minimum of required parts.

This object is achieved in accordance with the present invention by providing an apparatus for separating entrained liquid from a gas stream flowing through a gas conduit comprising a plurality of interconnected conduit sections; the apparatus comprising a conduit inlet section for introducing a stream of gas from which liquid is to be removed, a conduit outlet section for discharging a stream of gas from which liquid has been removed, and a drainage outlet for discharging liquid separated from the gas stream, and the apparatus forming the interconnection between the conduit inlet section and the conduit outlet section such that gas introduced through the conduit inlet section must undergo a sharp diversion in direction of flow before it can be discharged through the conduit outlet section.

The present invention has numerous advantages. The water separator according to the invention is formed by the connection of two pipe sections in the intake section. In most cases, the intake section of an internal combustion engine is comprised of several pieces anyway. Thus, the added expenditure of an additional water separator can be spared. Naturally, the use of the inventive water separator arrangement is not restricted to the air intake section of an internal combustion engine. Rather, it can be employed generally in liquid separators in gas conduits.

One advantageous embodiment of the invention envisions the insertion of the water separator before the air filter in an intake section. This is advantageous because it causes the filter to be contacted by the driest possible air.

Another advantageous embodiment of the invention provides that the water separator comprises a rebounding surface and a deflection edge. The deflection edge is part of the outlet pipe, which is part of the intake section, and forms a gap together with the rebounding surface, which is formed by a wall section of the intake pipe. Before the intake air can leave the water separator through the outlet pipe, it must pass through the gap, where it experiences a sharp rerouting. There, the water droplets contained in the intake air collect on the rebounding surface due to their inertia. The separated water can exit the system via an outlet.

One particular embodiment of the invention provides that the outlet pipe is formed by the intake opening or nipple of an air filter housing. This version of the water separator is advantageously integrated into the connection between the air filter housing and the intake channel.

According to another embodiment of the invention, the drain is provided with an outlet valve. This keeps intake air from entering through the outlet valve, which opens only to discharge the collected water.

A particular embodiment of the invention provides that one of the pipe sections ends in a rebounding pot, where the bottom of the pot forms the rebounding surface. The outlet pipe is inserted through the surface of the wall opposite the bottom of the pot. This arrangement is particularly advantageous when the two pipe sections form an angle of approximately 90 degrees.

A modification of the invention provides a guide rib which is attached to the rebounding surface and extends to the deflection edge of the pipe end. The guide rib thereby closes a part of the gap for deflecting the intake air. This type of arrangement is advantageous when the two pipe sections are supposed to be connected parallel to each other.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be explained in further detail hereinafter with reference to illustrative preferred embodiments shown in the accompanying drawings in which.

DETAILED DESCRIPTION OF PREFERRED EMBODIMENTS

Figure 1:
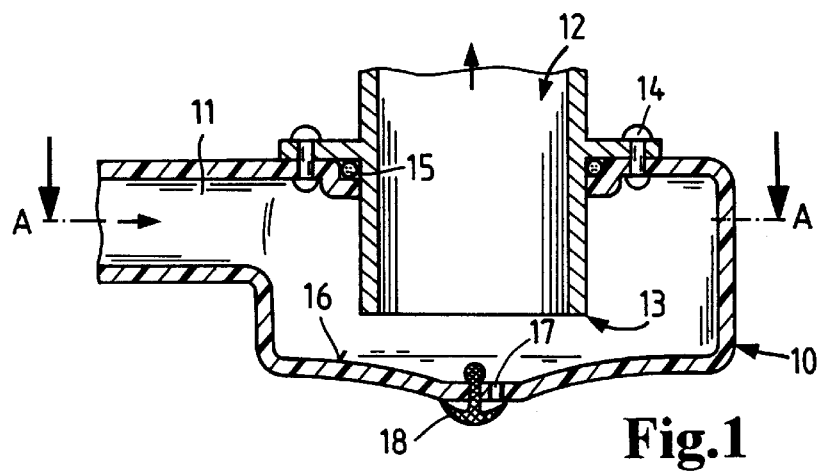
FIG. 1 shows a sectional view taken along line B—B of FIG. 2 of water separator comprising a pot and an outlet pipe.

In FIG. 1, a water separator is shown as part of an air intake channel. One of the pipe sections forms a rebounding pot 10, into which the inlet 11 of the gas conduit discharges. Another pipe section forms the outlet 12, where the pipe end forms a deflection edge 13 for the intake air. The two pipe sections are fastened to each other via a riveted joint 14. Naturally, other means of fastening are conceivable, for example a snap or a threaded connection. An O-ring 15 is provided as a seal between the two pipe sections.

The intake air enters the water separator through the inlet 11 and then is rerouted in the direction of the bottom of the rebounding pot 10. Then it flows around the deflection edge 13 and leaves the water separator through outlet 12. During rerouting, the water is separated on a rebounding surface 16, which is the same as the bottom of the pot. The separated water collects at a drain 17 in the bottom of the pot and can exit the water separator through an outlet valve 18. The outlet valve in this construction is produced as a single piece of rubber.

Figure 2:
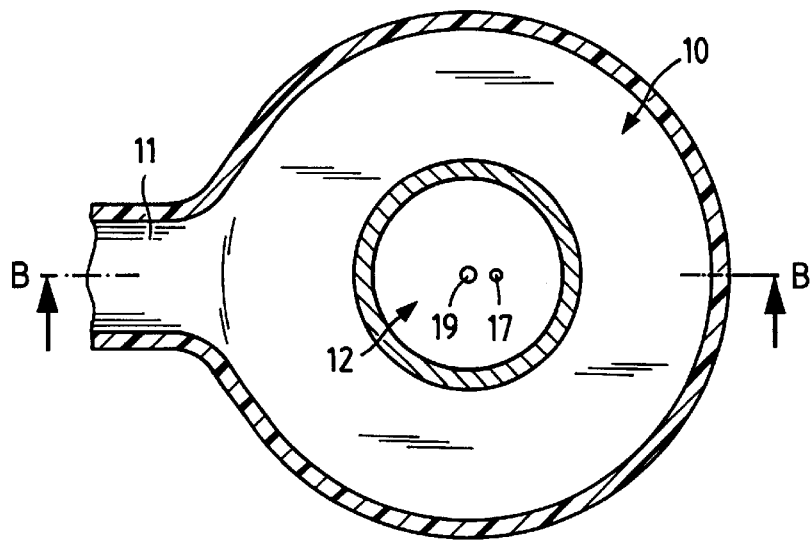
FIG. 2 shows another sectional view taken along line A—A of FIG. 1.

FIG. 2 shows the section A—A from FIG. 1. The rebounding pot 10, which surrounds the outlet 12 in an annular shape, can be seen. Also seen are the drain 17 and the receiving aperture 19, into which the outlet valve 18 is inserted.

Figure 3:
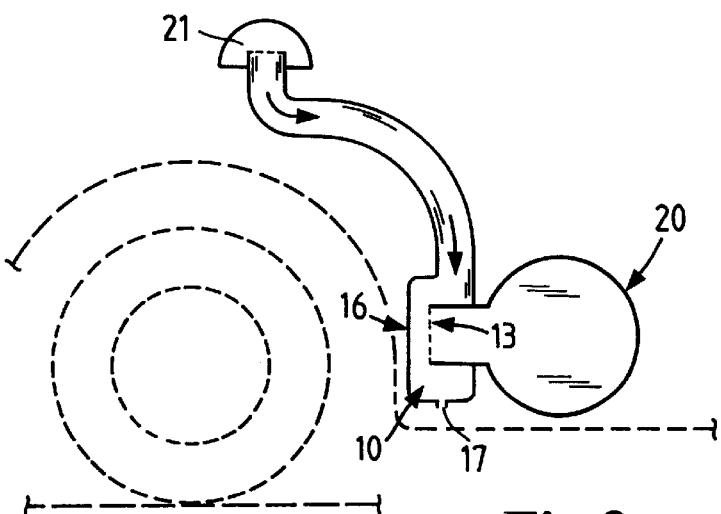
FIG. 3 shows a schematic view of a structural arrangement comprising an intake channel and filter housing in a motor truck.

FIG. 3 shows an example of the installation of a water separator behind the wheel housing of a motor truck. The intake section in front of the air filter housing 20 ends in the rebounding pot 10, where the water separator is located at the connection between the rebounding pot and an intake 21 of the air filter housing. A connection between the two parts can be achieved as in FIG. 1. As an alternative, it is equally possible to mount both pieces on the vehicle. This eliminates the necessity of an additional connection between the two parts.

The operation of the water separator does not depend upon its location. In the example according to FIG. 3, the rebounding surface extends perpendicularly to the direction in which gravity pulls. Due to the rerouting at the deflection edge 13, the water likewise separates onto the rebounding surface 16 and runs to the lowest point of the rebounding pot 10. At this location, the drain 17 must be provided.

Figure 4:
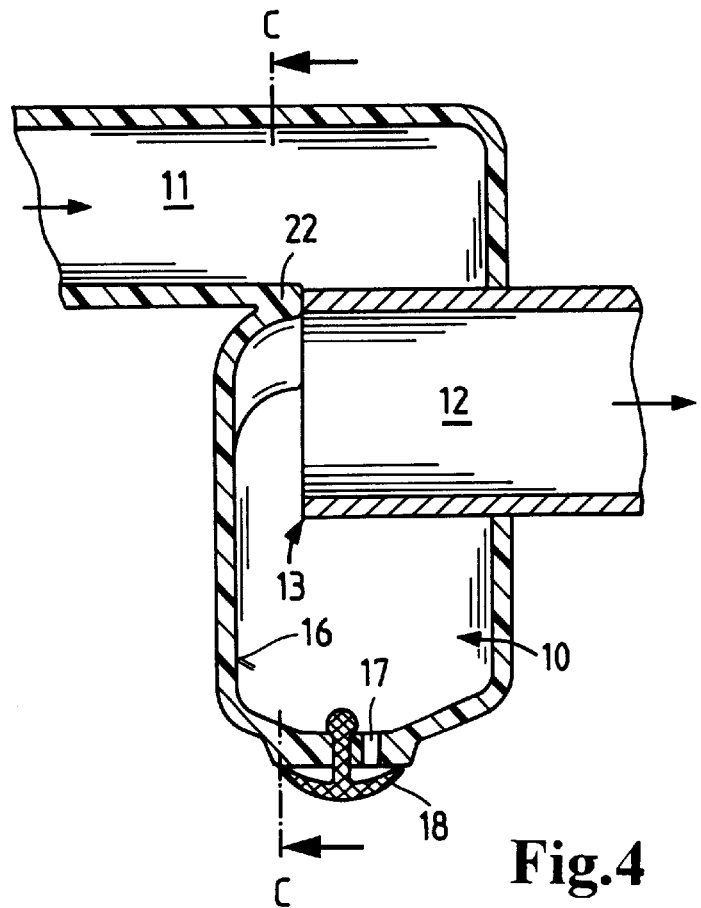
FIG. 4 shows a sectional view of the construction of a water separator with guiding rib.

FIG. 4 shows the construction of a water separator, where the inlet 11 and the outlet 12 extend parallel to each other. In this construction, the inlet continues through the bottom of the rebounding pot 10, which forms the rebounding surface 16. In this construction, measures must be taken to keep the air from flowing directly from the inlet into the outlet. For this reason, a guiding rib 22 is located in the region of the inlet 11 in order to cover the opening occurring between the deflection edge 13 and the rebounding surface 16.

Figure 5:
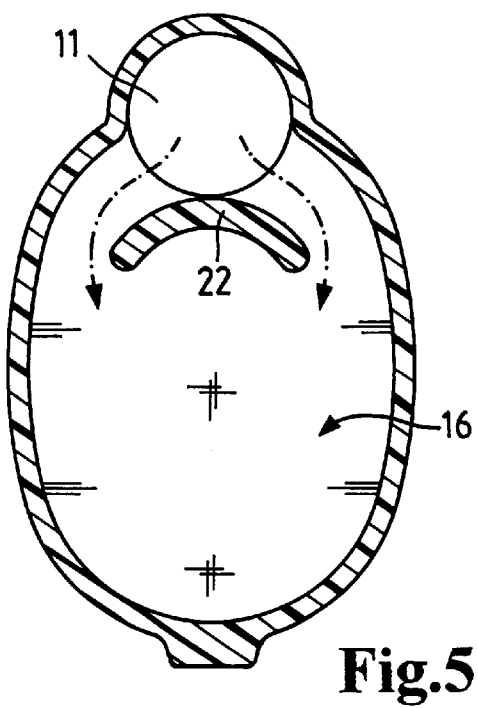
FIG. 5 shows a sectional view of the water separator of FIG. 4 taken along the line C—C.

FIG. 5 shows the section C—C of the arrangement according to FIG. 4.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An apparatus for separating entrained liquid from a gas stream flowing through a gas conduit comprising a plurality of interconnected conduit sections; said apparatus comprising a conduit inlet section for introducing a stream of gas from which liquid is to be removed, a conduit outlet section for discharging a stream of gas from which liquid has been removed, and a drainage outlet for discharging liquid separated from the gas stream, and said apparatus forming the interconnection between said conduit inlet section and said conduit outlet section such that gas introduced through said conduit inlet section must undergo a sharp diversion in direction of flow before it can be discharged through said conduit outlet section;

wherein said conduit outlet section is an intake nipple of an air filter housing.

2. A two-piece water separating apparatus comprising:

a first piece forming a conduit inlet section receiving a first stream of gas;

a second piece forming a conduit outlet section receiving a second stream of gas, the second piece comprising an air filter housing;

wherein the first piece is connected directly to the second piece to form a channel comprising a first channel portion which extends in a first routing direction and a second channel portion which extends in a different second routing direction to separate a liquid from the first stream of gas to form the second stream of gas.

3. An apparatus according to claim 2, wherein said apparatus is mounted in an engine air intake of a motor vehicle and serves to dewater the intake air for an internal combustion engine of the vehicle.

4. An apparatus according to claim 2, wherein the conduit outlet section is arranged upstream of an air filter.

5. An apparatus according to claim 2, wherein said channel includes a rebounding surface and a deflection edge which form a gap between them.

6. An apparatus according to claim 5, wherein one of the conduit sections ends in a rebounding pot into which an end of the other conduit section extends, said rebounding pot having a bottom which forms the rebounding surface of the apparatus, and said end of the other conduit section forming the deflection edge of the apparatus.

7. An apparatus according to claim 2, further including a guide rib which contacts an end portion of one of said conduit sections and prevents the first stream of gas from said conduit inlet section from flowing directly to said conduit outlet section without being rerouted.

8. An apparatus according to claim 2, wherein said conduit outlet section is an intake nipple of the air filter housing.

9. The apparatus of claim 2, further including a drainage outlet in the conduit inlet section for discharging the liquid which has been separated from the first stream of gas from the apparatus.

10. The apparatus of claim 2, further including a seal between the conduit inlet section and the conduit outlet section for sealing the connection between the conduit inlet section and the conduit outlet section.

11. An apparatus according to claim 9, further including an outlet valve provided at said drainage outlet.

12. A two-piece separating apparatus comprising:

a first piece forming a conduit inlet section for receiving a first stream of gas;

a second piece forming a conduit outlet section receiving a second stream of gas, the second piece comprising an air filter housing;

wherein the first piece is connected directly to the second piece to form a channel for directing the stream of gas through the conduit inlet section and the conduit outlet section, the channel comprising a means for separating a liquid from the first stream of gas to form the second stream of gas as it flows through the channel.

13. A method of making a two-piece separating apparatus comprising:

providing a first piece which forms a conduit inlet section receiving a first stream of gas;

providing a second piece which forms a conduit outlet section receiving a second stream of gas, the second piece comprising an air filter housing;

connecting the first piece directly to the second piece to form a channel comprising a first channel portion which extends in a first routing direction and a second channel portion which extends in a different second routing direction to separate a liquid from the first stream of gas to form the second stream of gas.

14. The method according to claim 13, further including sealing the connection between the first piece and the second piece.

* * * * *